US006791455B2

(12) United States Patent
Lowry et al.
(10) Patent No.: US 6,791,455 B2
(45) Date of Patent: Sep. 14, 2004

(54) VANDAL-LOCK/STARTER-INTERLOCK

(75) Inventors: Phillip W. Lowry, Mabelvale, AR (US); Johnnie L. Reed, Vilonia, AR (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 346 days.

(21) Appl. No.: 10/137,961

(22) Filed: May 3, 2002

(65) Prior Publication Data

US 2003/0206104 A1 Nov. 6, 2003

(51) Int. Cl.[7] .................................................. B60R 25/10

(52) U.S. Cl. ............................ 340/426.28; 340/426.11; 340/433; 340/545.1; 340/545; 340/540; 70/149; 70/472; 70/218

(58) Field of Search ........................ 340/426.28, 426.11, 340/433, 545.1, 545, 540, 541, 542; 70/149, 472, 218, 222, 224, 467

(56) References Cited

U.S. PATENT DOCUMENTS 4,090,175 A * 5/1978 Hart ........................... 340/5.3
4,461,160 A * 7/1984 Van Gompel ................ 70/100
5,214,293 A * 5/1993 MacNiel ................ 250/559.29

* cited by examiner

*Primary Examiner*—Jeffery Hofsass
*Assistant Examiner*—Hung T. Nguyen
(74) *Attorney, Agent, or Firm*—Jeffrey P. Calfas; Dennis Kelly Sullivan; Susan L. Lukasik

(57) ABSTRACT

The invention is for a vandal resistant latch/starter-interlock assembly for a bus door. In the assembly of the invention, the alarm and the starter-interlock are part of the same assembly. The assembly includes box through which a modified latch bolt extends laterally. The latch bolt is locked by a vandal lock. When unlocked, the latch bolt slides or moves to allow the door to be opened. The alarm and starter-interlock are activated after unlocking the vandal lock. Typically, the alarm is activated when the latch bolt is moved, usually by moving a door latch. While the starter-interlock can also be activated by moving the latch bolt, it is preferably activated by unlocking the vandal lock.

19 Claims, 5 Drawing Sheets

VANDAL-LOCK/STARTER-INTERLOCK

BACKGROUND OF THE INVENTION

1. Field of the Invention

The present invention relates to a vandal resistant lock/starter-interlock assembly for buses.

2. Description of the Prior Art

At the end of the work day, buses, especially school buses, are parked outdoors, often in isolated and/or high crime areas. In addition, buses have large doors and many windows. The parking location and bus design make the buses easy targets for vandals and thieves.

As shown in the prior art in FIG. 1, school buses use two latching mechanisms mounted on the door's exterior to reduce vandalism. The door 114 is closed by the driver from the inside with a latch assembly 110 on the door's exterior connected to a buzzer or alarm box 113. Starter interlock 120, which prevents the bus from starting when the door is open, is separate from the door latching/alarm assembly. Latch 118 has a sliding latch bolt 116 that extends and connects to an alarm switch 111 within alarm box 113. Breaking the connection between alarm switch 111 and latch bolt 116 activates the alarm.

However, the activation of the alarm does not activate the interlock. A second latching assembly using an ordinary slide bolt 122 connects to a starter-interlock switch within a second box 120 located below alarm box 113. When slide bolt 122 opens, it disconnects from the starter-interlock switch within second box 120. The disconnection activates the starter-interlock system and prevents the bus from being started.

This system requires several external parts attached to the exterior of the door. The assembly of these parts require additional subassembly time and production time. The system also requires the driver to both open the door and unlatch the starter-interlock to activate the starter-interlock.

This prior art assembly requires the alarm to be mounted on the exterior of the skin. Therefore after a break-in, the buzzer alarm can be circumvented. A thief could tape the switch, for example, to keep the switch in its connected position. A vandal can break the alarm itself or remove it from the bus with a object, such as a crow bar.

Because the starter-interlock assembly is separate from the buzzer alarm assembly, if the alarm is vandalized, the starter-interlock can remain intact. This could allow a vandal or thief to start the bus.

The ordinary slide bolt used for the starter-interlock assembly is vulnerable to vandalism. A vandal can easily break the slide bolt with a crow bar or rock. Part of the slide bolt or a rod with a similar diameter, such as a pencil can be left within the starter-interlock assembly connected to the switch.

Therefore, one goal of the invention is to produce a secure alarm and vandal-lock/starter-interlock system that resists vandalism. Another goal of the invention is to produce an alarm/starter-interlock system that can be key locked from the inside. Another goal of the invention is to streamline the assembly of the bus by eliminating a number of parts. Reducing the number of parts can reduce the subassembly time and production time and may possibly reduce the number of overall components and assembly costs.

SUMMARY OF THE INVENTION

The invention provides a secure alarm and latch/starter-interlock assembly for a bus door which is vandal resistant.

The assembly has a vandal lock with a latch lock adapted to engage a latch bolt and prevent the movement of the latch bolt when locked. The assembly also has means for moving the latch bolt when the vandal lock is unlocked. Both alarm means and starter-interlock means are located within a starter-interlock box. The starter-interlock box has first and second plates and box sides attached to one plate. When unlocked, the alarm means activate an alarm and the starter-interlock means activates a starter-interlock. Typically, the alarm is activated when the latch bolt is moved, usually by moving a door latch. While the starter-interlock can also be activated by moving the latch bolt, it is preferably activated by unlocking the vandal lock.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

The door latch/starter-interlock assembly of the invention uses the door latch rather than a separate latch for the starter-interlock. In addition, the door latch also activates a buzzer alarm. This assembly requires the use of only one latch and therefore, one step to activate the starter-interlock system upon opening the door and activating the alarm.

Figure 1:
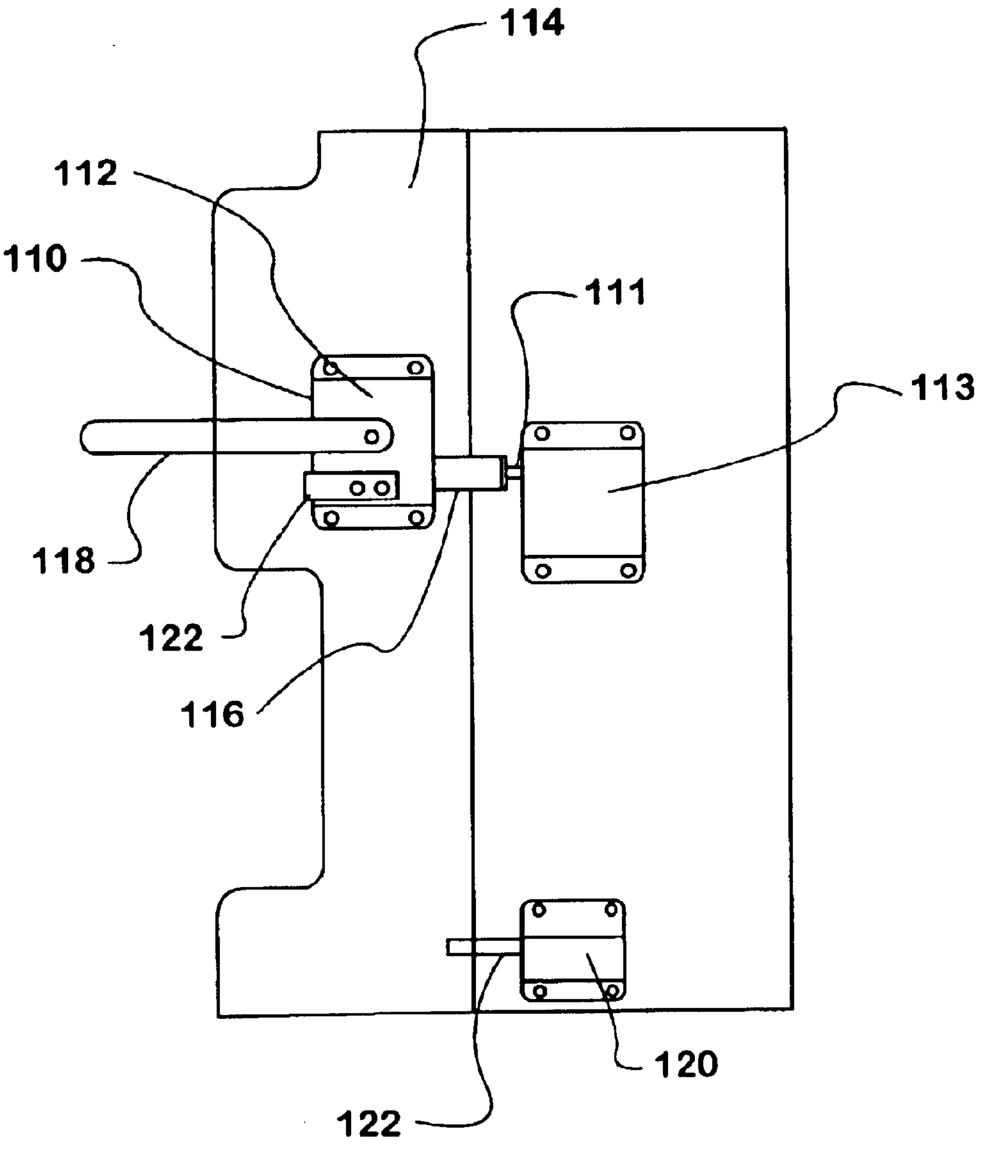
FIG. 1 PRIOR ART
FIG. 1 is a prior art door latch/alarm assembly with a separate starter-interlock assembly.
Figure 2:
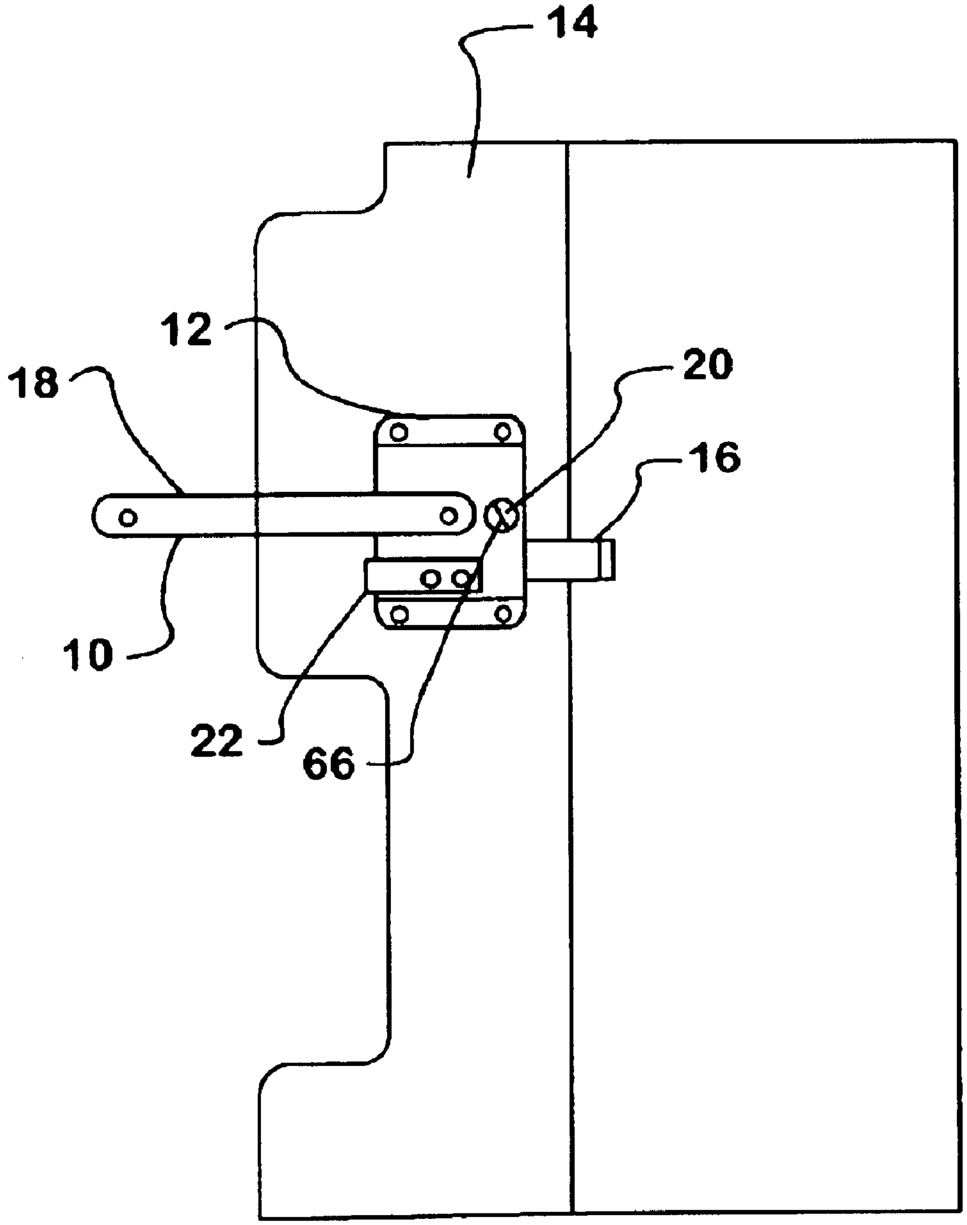
FIG. 2 is a door latch/starter-interlock assembly of the invention.

Turning to the figures where like numerals refer to like features, the embodiment of the assembly 10 of the invention shown in FIG. 2 has a door latch/starter-interlock box 12 fastened to an interior face of bus door panel 14. Sliding latch bolt 16 extends over the door in the closed position when door latch 18 is horizontal. Vandal lock 20 is located next to door latch 18.

Figure 3:
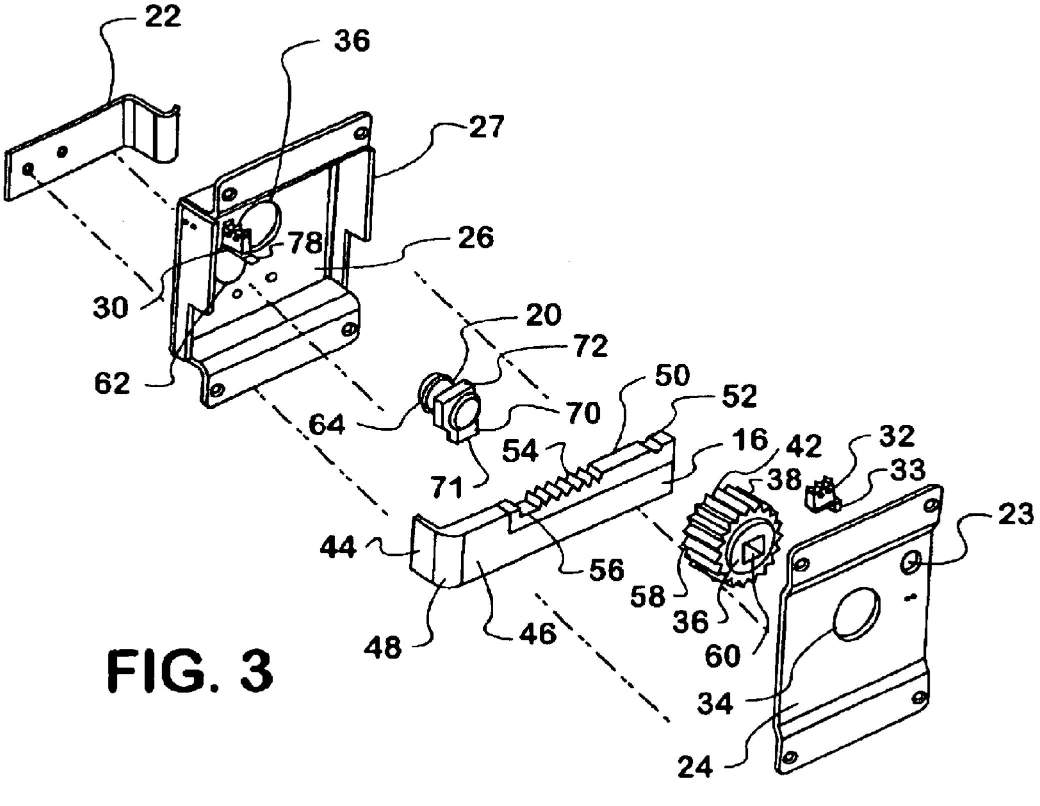
FIG. 3 is an exploded view of a door latch/starter-interlock assembly of the invention.

FIG. 3 shows box 12 having first 24 and second 26 plates. First plate 24 has a wiring hole 28 through which wiring for a starter-interlock switch 30 and a door alarm switch 32 passes, as well as a first gear aperture 34 through which a first face 36 of latch gear 38 extends. Second plate 26 has a cylinder opening 62 and second gear aperture 35 through which a second face 42 of latch gear 38 extends. Attached to second plate are box sides 27. Box sides 27 are cut to fit latch bolt 16. Bracket 22 fastens to second plate 26 and supports the box 12 against the exterior skin of the bus door.

Latch bolt 16 is designed for either a right hand or left hand orientation which are mirror images of each other.

Latch bolt is L-shaped with first 44 and second 46 portions that are approximately perpendicular to each other. Outer corner 48 can be rounded or curved. Latch bolt 16 can be narrower distal from corner 48. Notch side 50 of latch bolt 16 has an alarm switch notch 52 distal to corner 48, for example, although the notch side can be cut out to the end in place of a notch. Alarm switch notch 52 can be shallow and curved or semicircular. Alarm switch 32 has alarm spring 33 that fits within alarm switch notch 52 in an extended position. Between alarm switch notch 52 and corner 48 are latch bolt teeth 54 and tongue notch 56. The buzzer alarm can be located within the skin of the bus.

Latch gear 38 has gear teeth 58 that engage latch bolt teeth 54. Latch gear 38 has a central door latch opening 60 for receiving door latch fastening means, such as an arm, pin or peg from door latch 18 (not shown). Latch gear 38 partially extends through the gear apertures.

Vandal lock 20 extends through cylinder opening 62 within second plate 26 where it engages starter-interlock switch 60 and latch bolt 16. Vandal lock 20 can be any lock that secures latch bolt 16 in position, such as a keyed, electronic or combination lock, although a keyed lock is more convenient for the driver and could be keyed to match the exterior bus lock. Vandal lock 20 has an exterior key hole 66, lock cylinder 64 and latch lock 68. Latch lock 68 has a tongue 70 and a switch end 72. Tongue 70 extends through lock cylinder 64 with its head 71 fitting within tongue notch 56 of latch bolt 16 when locked. Switch end 72 opposite head 71 connects to tongue 70 and engages starter-interlock switch 30 when in the locked position. In this embodiment, switch end 72 has a shoulder 73 that depresses switch spring 78 of starter-interlock switch 30 when locked. If desired, the position of the alarm switch and the starter-interlock switch could be exchanged. Alternatively, the alarm switch could be placed next to the starter-interlock switch and activated at the same time the vandal lock is unlocked.

Figure 6:
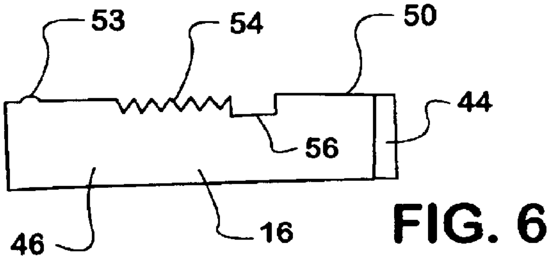
FIG. 6 is a plan view of an alternative latch lock for the assembly of the invention.

Door latch 18 attaches to door latch opening 60 of toothed gear 38. When unlocked by a key, tongue 70 of latch lock 68 slides out of tongue notch 56 and into the cylinder. Switch end 72 engages the switch spring 78 of starter-interlock switch 30. This frees latch bolt 16 to move laterally upon the rotation of toothed gear 38 when latch 18 is pulled vertically. The movement of switch end 72 activates starter-interlock switch 30 which in turn activates the starter-interlock to prevent the bus from starting. Alarm switch 32 disengages from alarm switch notch 52 which depresses alarm switch spring 33 and activates alarm switch 32 to turn on the alarm. Alternative to an alarm switch notch 52, shallow projection 53 as shown in FIG. 6 can extend from notch side 50 toward alarm switch 32 to depress alarm switch spring 33 when in the locked position. When latch bolt 16 moves, alarm switch spring 33 disengages from the projection which activates the alarm.

Figure 4:
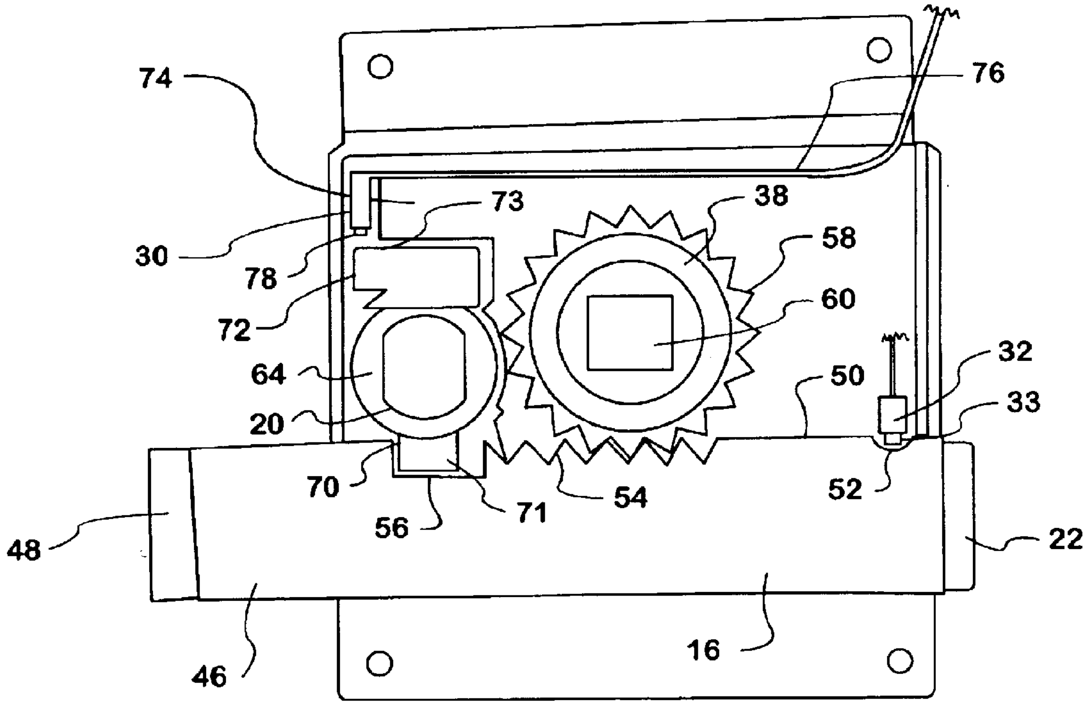
FIG. 4 is a plan view of the interior of a door latch/starter-interlock assembly of the invention in the locked position with the first plate removed.
Figure 5:
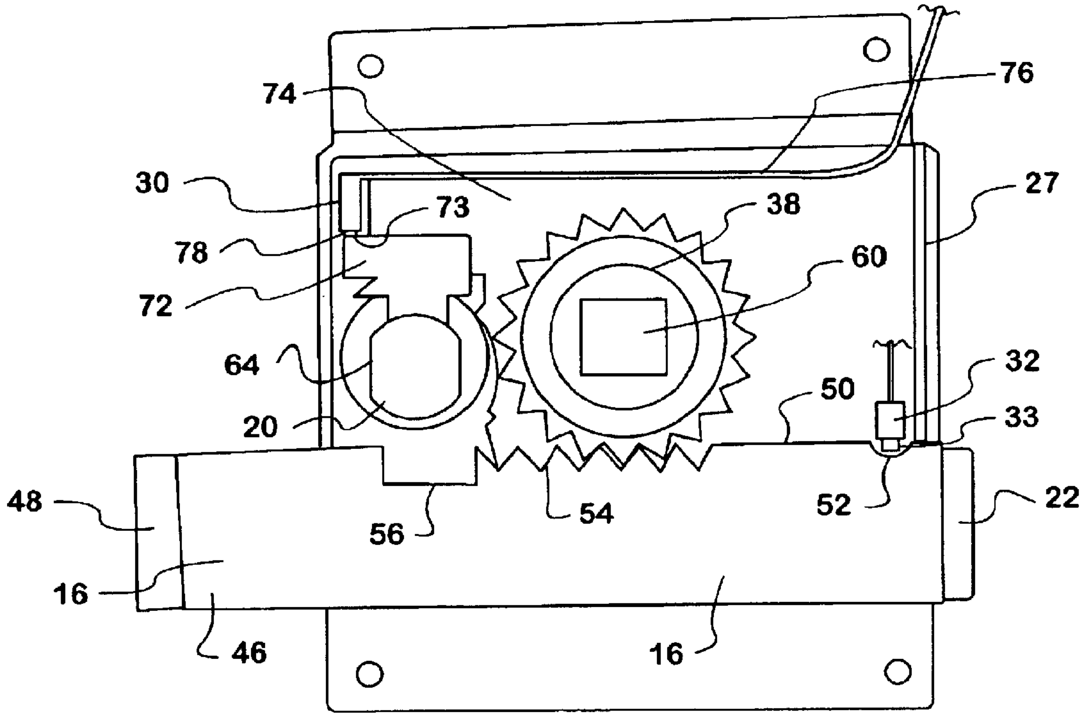
FIG. 5 is a plan view of the interior of a door latch/starter-interlock assembly of the invention in the unlocked position with the first plate removed.

Alternatively, as shown in FIGS. 4 and 5, a starter interlock box 12 has interior plate 74 between first 24 and second 26 plates. Interior plate 74 has a gear aperture (not shown) to fit second face 42 of latch gear 38 and can fit against the interior of second plate 26. Interior plate 74 is also cut to fit latch lock 68 and starter-interlock switch 30, and if desired, starter-interlock wiring 76. Latch gear 38 and latch bolt 16 lie between first plate 24 and interior plate 74. While head 71 of tongue 70 is within tongue notch 56, the starter-interlock switch spring 78 does not engage switch end 72. When unlocked, switch end 72 engages starter-interlock switch spring 78 and activates the starter-interlock.

The invention has several advantages. The interlock latching mechanism and door alarm switch integrates into one assembly. The driver need only move the door latch to both open the door and activate the starter-interlock. The driver can also lock the bus from the inside with a key. The assembly requires fewer parts than the prior art assemblies, making it more economical to assemble and make.

The buzzer alarm can be located within the skin of the bus where it is less likely to be vandalized. To turn the hidden alarm off, a vandal would have to break through the skin of the bus to break or turn off the alarm. Further, the door area appears more attractive, less cluttered.

The latch/starter-interlock assembly requires a keyed, combination or electronic lock to unlock the door latch. Therefore, a vandal or thief cannot break into the bus and open the door without first unlocking the lock. The latch bolt is less prone to vandalism than an ordinary slide bolt and cannot easily break with a crow bar. Because the latch bolt is more difficult to break, the starter-interlock itself is more resistant to vandalism.

While the invention is shown in only one of its forms, it is not thus limited but is susceptible to various changes and modifications without departing from the spirit and scope of the invention.

What is claimed is:

1. An assembly for a bus door comprising:

a starter-interlock box having first and second plates and box sides attached to one plate;

a latch bolt;

a vandal lock having a latch lock adapted to engage the latch bolt and prevent the movement of the latch bolt when locked;

means for moving the latch bolt when the vandal lock is unlocked;

alarm means located within the starter-interlock box for activating an alarm when the vandal lock is unlocked; and starter-interlock means located within the starter-interlock box for activating a starter-interlock when the vandal lock is unlocked.

2. An assembly for a bus door of claim 1, wherein the latch bolt further comprises:

first and second portions approximately perpendicular to each other.

3. An assembly for a bus door of claim 2, further comprising:

a cylinder opening in the second plate.

4. An assembly for a bus door of claim 3, the vandal lock further comprising:

a lock cylinder extending through the cylinder opening;

a switch end;

a tongue connected to the switch end, the tongue extending through the lock cylinder; and wherein the tongue engages the latch bolt when the vandal lock is locked.

5. An assembly for a bus door of claim 4, wherein the starter-interlock means further comprises:

a starter-interlock switch within the starter-interlock box adapted to engage the switch end.

6. An assembly for a bus door of claim 5, wherein the alarm means further comprises:

an alarm switch within the starter-interlock box adapted to engage the latch bolt.

7. An assembly for a bus door of claim 6, wherein the latch bolt has latch bolt teeth.

8. An assembly for a bus door of claim 7, further comprising:

a wiring hole in the first plate; and a gear aperture in the second plate.

9. An assembly for a bus door of claim 8, wherein the means for moving the latch bolt further comprises:

a toothed gear adapted to engage the latch bolt teeth and partially extending through the gear aperture.

10. An assembly for a bus door comprising:

a starter-interlock box having first and second plates and box sides attached to one plate;

an alarm switch within the starter-interlock box;

a latch bolt having a tongue notch, and wherein the latch bolt extends through the box sides of the starter-interlock box and is adapted to engage the alarm switch;

a vandal lock comprising a latch lock having a switch end and a tongue, the tongue being adapted to fit within the tongue notch when in an extended position;

a starter-interlock switch located within the starter-interlock box adapted to engage the vandal lock; and means for moving the latch bolt when the vandal lock is unlocked.

11. An assembly for a bus door of claim 10, further comprising:

a cylinder opening in the second plate;

a lock cylinder extending through the cylinder opening; and wherein the tongue extends through the lock cylinder when the vandal lock is locked.

12. An assembly for a bus door of claim 11, wherein the latch bolt has latch bolt teeth.

13. An assembly for a bus door of claim 12, wherein the means for moving the latch bolt further comprises:

a toothed gear extending through the gear aperture and adapted to engage the latch bolt teeth.

14. An assembly for a bus door of claim 13, further comprising:

a wiring hole in the first plate; and a gear aperture in the second plate.

15. An assembly for a bus door of claim 14, wherein the means for moving the latch bolt further comprises:

a toothed gear adapted to engage the latch bolt teeth and partially extending through the gear aperture.

16. A bus door assembly comprising:

a door panel;

a starter-interlock box having first and second plates and box sides attached to one plate;

a latch bolt;

a vandal lock having a latch lock adapted to engage the latch bolt and prevent the movement of the latch bolt when locked;

means for moving the latch bolt when the vandal lock is unlocked;

alarm means located within the starter-interlock box for activating an alarm when the vandal lock is unlocked;

starter-interlock means located within the starter-interlock box for activating a starter-interlock when the vandal lock is unlocked; and means for fastening the starter-interlock box to an interior face of the door panel.

17. A bus door assembly of claim 16, wherein the means for moving the latch bolt further comprises:

latch bolt teeth in the latch bolt;

a toothed gear engaging the latch bolt teeth; and a door latch matingly engaging the toothed gear.

18. A bus door assembly comprising:

a door panel;

a starter-interlock box having first and second plates and box sides attached to one plate;

an alarm switch within the starter-interlock box;

a latch bolt having a tongue notch, wherein the latch bolt extends through the box sides of the starter-interlock box and is adapted to engage the alarm switch;

a vandal lock comprising a latch lock having a switch end and a tongue, the tongue being adapted to fit within the tongue notch when in an extended position;

a starter-interlock switch located within the starter-interlock box and adapted to engage the switch end;

means for moving the latch bolt when the vandal lock is unlocked; and means for fastening the starter-interlock box to an interior face of the door panel.

19. A bus door assembly of claim 18, wherein the means for moving the latch bolt further comprises:

latch bolt teeth in the latch bolt;

a toothed gear engaging the latch bolt teeth; and a door latch matingly engaging the toothed gear.

* * * * *